United States Patent Office 3,320,243
Patented May 16, 1967

3,320,243
NEW HYDROXY COMPOUNDS AND THEIR ESTERS AND ETHERS
Ernst Habicht and Georg Feth, Schaffhausen, Switzerland, assignors to Cilag-Chemie Limited, Schaffhausen, Switzerland, a Swiss company
No Drawing. Filed Mar. 10, 1964, Ser. No. 350,663
7 Claims. (Cl. 260—243)

This application is a continuation-in-part of our copending application Ser. No. 147,189, filed on Oct. 24, 1961, now forfeited, and Ser. No. 245,972, filed on Dec. 20, 1962, now abandoned.

The present invention concerns new hydroxy compounds and their esters.

More particularly, it relates to new phenothiazine derivatives of the general formula

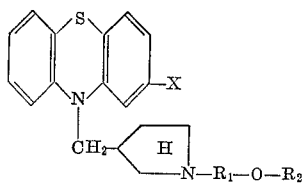

I wherein X means hydrogen or chlorine, $R_1$ represents an alkylene radical having 2 to 3 carbon atoms, and $R_2$ stands for hydrogen or a lower acyl radical or methyl as well as their acid addition and quaternary salts.

The phenothiazines defined by the general Formula I derive from the alcohols not yet described of the formula

II

They can be used as antihistaminics, ganglioplegics, for the potentiation of substances with analgetic or hypnotic effect. They find their special application in psychiatric practice as tranquilizers. They have furthermore a strong antiphlogistic and temperature lowering effect.

The new hydroxy compounds and their esters and their methylethers respectively of the Formula I have over the 10 - [1' - alkylpyrrolidyl - 3'-methyl]-phenothiazines described in the British patent specification No. 813,428 the advantage of a strong central analgetic activity. For instance the known 10 - [1'-propylpyrrolidyl-3'-methyl]-phenothiazine (A) was subjected to comparative examination regarding toxicity and analgetic effect with 10-[1'-β - hydroxyethyl-pyrrolidyl-3'-methyl]-phenothiazine (B) and 10 - [1'-β-N,N-dimethyl-carbamoyloxy-ethyl-pyrrolidyl-3'-methyl]-phenothiazine (C) and 10-[1-β-methoxy-ethyl-pyrrolidyl-3'-methyl]-phenothiazine (D) substances of this invention. The following figures were obtained:

| Toxicity | A | B | C | D |
|---|---|---|---|---|
| $LD_{50}$ mg./kg. mouse i.v. | 49.5 | 35.5 | 43.6 | 45 mg. K. |

| Analgesy | Average increase of the stimulation threshold in percent | | | |
|---|---|---|---|---|
| | WITHIN 90 MINUTES | | | |
| 10 mg./g. i.v. rabbit tooth | 13.9 | 326 | 249 | 92.4 |
| | WITHIN 90-180 MINUTES | | | |
| | 3.8 | 153 | 88.9 | 37.8 |

The products (B), (C) and (D) show, compared to the known product (A), a toxicity comparable in the ratio, but an incomparably stronger analgetic effect.

The new phenothiazine derivatives can be obtained in known manner by reacting a phenothiazine of the formula

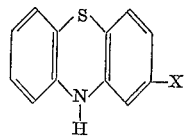

III wherein X has the meaning defined above, or a N metal salt of such a phenothiazine respectively, with a reactive ester of an alcohol of the formula

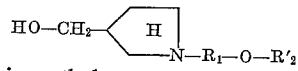

II wherein $R'_2$ is methyl or a radical splittable by hydrogenolysis, and after performed reaction, if desired, splitting the radical $R'_2$ by hydrogenolysis and, if desired, esterifying the obtained free hydroxyalkyl compound.

As reactive esters of alcohols of the Formula II there are used esters of strong acids, for instance the hydrohalide acid esters, the alkyl-, arylsulfonic acid esters respectively.

The reaction is preferably performed in a solvent or diluting agent as benzene, toluene, cumene or dioxane in the presence of a condensing agent, such as for instance an alkali amide, an alkali oxide or an alkali hydride. Thereby it is also possible to preform a metal salt of a phenothiazine of the Formula III and then to react this with a reactive ester of an alcohol of the Formula II. There can, of course, also be preformed a N magnesyl salt of the phenothiazine, for example with the aid of alkylmagnesium halides, and this N magnesyl salt can be reacted with a reactive ester of an alcohol of the Formula II. As particularly reactive has proved the lithium salt of the phenothiazine in pyridine as solvent. This can be formed with the aid of lithium amide.

According to the process described, it is possible to react a reactive ester of a 1-methyloxyalkyl-pyrrolidyl-3-carbinol or a reactive ester of 1-benzyloxyalkyl-pyrrolidyl-3-carbinol or of a 1-benzhydryloxy-, or of a 1-carbobenzoxy-alkyl-pyrrolidyl-3-carbinol respectively with a phenothiazine or a N metal salt thereof. After the reaction is carried out, the benzyl-, benzhydryl- or the carbobenzoxy group may be split off by catalytic hydrogenation. Splitting of the group $R'_2$ is preferably performed in an alcoholic solution in the presence of a mineral acid by means of catalytically activated hydrogen. As catalyst preference is given to palladium/charcoal (5–10%). As a rule, the application of pressure is not necessary, but if applied, it will accelerate the reduction.

The 1-hydroxyalkyl compound thus obtained, if desired, can be subsequently esterified, for instance by means of a reactive derivative of an aliphatic acid, for example by means of a chloride or anhydride.

As aliphatic acid can be used: acetic acid, propionic acid, butyric acid, pivalic acid, methoxy acetic acid, α-methoxypropionic acid, β-methoxypropionic acid, valeric acid.

The obtained 1-hydroxyalkyl compounds can also be transformed into carbamates, for instance by means of N-alkyl-carbamic acid halogenides or N,N-dialkyl-carbamic acid halogenides or corresponding isocyanates. Preference is given to the production of N-methyl-, N-ethyl-, N-isopropyl-, N,N-dimethyl- and N,N-diethyl carbamates.

The reaction of 1-hydroxyalkyl compounds with the carbamic acid halogenides is preferably carried out in the presence of a tertiary amine, such as pyridine, triethylamine, ethyl-diisopropylamine, etc.

Salts of the new pyrrolidyl-3-methyl-phenothiazines are particularly therapeutically acceptable, non-toxic acid addition salts, such as those with inorganic acids, e.g., hydrochloric acid, hydrobromic acid, sulfuric acid, phosphoric acid, sulfamic acid and the like, or those with organic acids such as organic carboxylic acids, e.g., acetic acid, propionic acid, lactic, pyruvic, oxalic, malonic, succinic, maleic, fumaric, malic, tartaric, citric, ascorbic, hydroxymaleic, dihydroxy-maleic, benzoic, phenylacetic, 4-aminobenzoic, 4-aminosalicylic, salicylic, 4-hydroxybenzoic, 2-acetoxybenzoic and the like, or organic sulfonic acids, e.g., methane sulfonic, ethane sulfonic, ethane disulfonic, 2-hydroxy ethane sulfonic, p-toluene sulfonic and the like.

The transformation of the pyrrolidylmethyl-phenothiazines into quaternary salts is performed by means of alkyl halogenides, alkyl sulfates or alkyl alkane sulfonates in inert solvents as ethers, ethyl acetate, etc.

The 1-R'$_2$-oxyalkyl-3-hydroxymethyl-pyrrolidines used as starting products can be prepared in the following way:

Itaconic acid or an itaconic acid ester, preferably an alkyl ester, is reacted with an R'$_2$-oxyalkylamine, thus resulting a 1-(R'$_2$-oxyalkyl)-5-pyrrolidone-3-carboxylic acid, or -3-carboxylic acid ester respectively. The reaction is preferably carried out in the heat and advantageously at temperatures between 100° C. and 180° C. The thus prepared pyrrolidone carboxylic acid, or a corresponding ester thereof is then reduced to the corresponding R'$_2$-oxyalkyl-3-hydroxy-methyl-pyrrolidine by means of LiAlH$_4$ or copper chromoxide/catalyst in the presence of hydrogen under pressure.

In the following there is described in more detail the preparation of one of the desierd 3-hydroxymethyl-pyrrolidines.

(a) 316 g. of itaconic acid and 367.5 g. of benzyloxyethylamine are heated in a 1 l. flask in the air bath while turbinating. After heating for two hours to 125–175° C. (internal temperature), the whole is allowed to cool down and 350 cc. of chloroform are added. After having been left to stand for a considerable long time, the whole is again shaken in the separating funnel with 900 cc. of chloroform and then separated. The aqueous solution is again washed with chloroform and the chloroform solution is then extracted with 2 N HCl. The chloroform solution is dried over sodium sulfate, filtered and concentrated. The residue crystallizes after some time to reddish needles, melting at 76–79° C. The yield is 589 g. corresponding to 92% of the theoretical value. After recrystallization from benzene/ether, there is obtained the 1-[β-benzyloxyethyl]-5-pyrrolidone-3-carboxylic acid in colorless needles, melting at 79–81° C.

(b) A solution of 228 g. of the carboxylic acid obtained according to (a) in 350 cc. of absolute dioxane is added dropwise to a solution of 70 g. of LiAlH$_4$ in 590 cc. of absolute dioxane and 260 cc. of absolute tetrahydrofuran. The reaction takes place while stirring and under nitrogen atmosphere. The whole is held for 5 hours at a temperature of 75–80° C., cooled and treated with 138 cc. of water and 65 cc. of concentrated NaOH. Subsequently the whole is treated with 165 g. of calcinated soda, sucked through a frit, and the residue is washed with dioxane. The filtrate is concentrated and the residue distilled in the high vacuum. There are obtained 182 g., corresponding to 89% of the theoretical value, of 1-(β-benzyloxyethyl)-3-hydroxymethyl-pyrrolidine, which boils under 0.2 mm. Hg at 142–143° C.

In analogous manner as described under (a) and (b) there are obtained:

1-[γ-benzyloxypropyl]-3-hydroxymethyl-pyrrolidine;
1-[β-benzyloxypropyl]-3-hydroxymethyl-pyrrolidine.

The 1-methoxyalkyl-3-hydroxymethyl-pyrrolidines can also be prepared in the following way:

A malonic acid ester of the formula

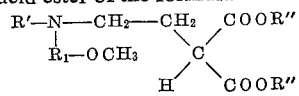

IV wherein R' signifies a radical which can be split off by hydrogenolysis and R'' signifies alkyl or aryl, preferably methyl or ethyl, is subjected to catalytic hydrogenation. The radical R' is thereby replaced by H, whereby cyclisation to the pyrrolidone of the formula

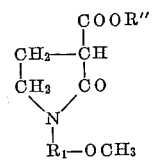

V occurs simultaneously (R' can be: benzyl, benzhydryl, trityl, carbobenzoxy, etc.). The catalysts used are the usual such as palladium/charcoal, Raney nickel, etc. The hydrogenolytic splitting of the radical R' takes place already under normal pressure and at room temperature in lower alkanols, such as for instance methanol, ethanol, or propanol. It is, of course, also possible to hydrogenate at increased temperature and under increased pressure.

The thus resulting pyrrolidone of the Formula V is now transformed into the carbinol of the formula

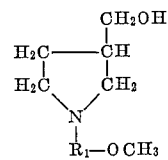

IIb by means of the reducing agents usual for such reductions, such as for instance LiAlH$_4$, sodium in butanol. This carbinol can be transformed into the respective halogenomethyl compound by means of halogenating agents, such as for instance HBr in methanol, thionyl chloride in chloroform, phosphorus halogenides, etc.

Moreover, a carbinol of the Formula II can also be transformed into an ester of an organic sulfonic acid, for instance by reaction with mesylchloride or toxyl chloride in the presence of pyridine or another tertiary base, for instance triethylamine. Such esters of organic sulfonic acids condense readily with phenothiazine or a salt of a phenothiazine.

In the following there is described more in detail the preparation of 1-β-methoxyethyl-3-hydroxymethyl-pyrrolidine:

(a) *Diethyl-α-(N-benzyl-N-β' - methoxyethyl - aminoethyl)-malonate.*—To a suspension prepared in the usual manner from 28.2 g. of sodium in 400 cc. of absolute xylene are added in a thin jet 276 g. of diethylmalonate in 300 cc. of absolute benzene. The sodium salt forms with self-heating. The whole is held for 30 minutes at 80–90° C. while stirring mechanically. There are then added in small portions 257 g. of N-benzyl-N-β-methoxyethyl-aminoethyl-chloride in 150 cc. of benzene. The reaction mixture is heated for 10 hours to boiling while stirring. Subsequent to cooling the mass is treated with ice and water, the benzene/xylene layer separated and the latter extracted with ice water and then with 2 N hydrochloric acid. The combined aqueous extracts are washed with ether and then rendered alkaline was saturated aqueous potassium carbonate solution. The separating oil is taken up in ether, the ethereal solution dried and then evaporated. The residue is distilled under high vacuum. There are obtained 296 g. of the title substance, which boils under 0.1 mm. Hg pressure at 172–178° C.

(b) *Ethyl-1-β-methoxyethyl-(2)-pyrrolidone - 3 - carboxylate.*—130 g. of the malonate obtained according to (a) are hydrogenated in 350 cc. of dry ethanol in the presence of 14 g. of 5% Pd/charcoal under normal pressure and at room temperature. The volume of hydrogen calculated is taken up within approximately 70 minutes. The catalyst is sucked off and the filtrate evaporated in vacuo. The residue is distilled in vacuo, whereby 107 g.

of the pyrrolidone carboxylic acid ester is obtained, boiling under 0.1 mm. Hg pressure at 117–119° C.

(c) *1-β-methoxyethyl-3-hydroxymethyl pyrrolidine.*—107 g. of the pyrrolidone-carboxylic acid ester obtained according to (b) are reduced in a mixture of 350 cc. of dioxane and 250 cc. of tetrahydrofuran by means of 45.5 g. of $LiAlH_4$ (stirring for 10 hours at 80° C.). After working up in the usual manner there are obtained 65 g. of the above captioned pyrrolidine as a colorless liquid, boiling under 12 mm. Hg pressure at 129–132° C. The new pyrrolidine forms a series of readily soluble salts, among which the hydrochloride and the sulfate particularly excel for their hygroscopicity.

(d) *1-β-methoxyethyl-3-chloromethyl-pyrrolidine.*—59 g. of 1-β-methoxyethyl-3-hydroxymethyl-pyrrolidine in 250 cc. of anhydrous chloroform are added dropwise with ice cooling and while mechanically stirring to a solution of 53 g. of thionyl chloride in 50 cc. of anhydrous chloroform. The whole is allowed to slowly reach room temperature and is then heated within 3 hours to boiling. After further 3 hours follows cooling and evaporating of the solvent in vacuo. The residue is triturated with anhydrous ether, the resulting crystallisate treated with ether and then sucked off. The hydrochloride thus obtained is highly hygroscopic, wherefor the free base to be used for the reactions described here below is prepared by means of sodium hydroxide. The base is taken up in ether, the ethereal solution evaporated and the residue distilled under high vacuum. There are obtained 56 g. of 1-β-methoxyethyl - 3 - chloromethyl - pyrrolidine, which boils under 11 mm. Hg pressure at 103–105° C.

EXAMPLE 1

*10-[1'-β-methoxyethyl-pyrrolidyl-(3')-methyl]-phenothiazine*

38 g. of phenothiazine in 130 cc. of anhydrous xylene are heated with 4.3 g. of lithiumamide for half an hour with stirring and exclusion of air. To the solution of the lithium salt thus obtained is added dropwise a solution of 28 g. of 1-β-methoxyethyl-3-chloromethyl-pyrrolidine in 30 cc. of anhydrous xylene. The whole is boiled for 45 hours while stirring. Subsequent cooling is followed by treatment with 100 cc. of water, suction of the solid particles and washing with benzene. The aqueous layer is separated and the xylene layer washed repeatedly with water. After drying over sodium carbonate the organic layer is evaporated in vacuo and the residue shaken well with ether and 150 cc. of 2 N acetic acid. The ethereal layer is likewise extracted with 2 N acetic acid, the aqueous acid solutions combined and rendered alkaline with sodium hydroxide. The separating oil is taken up in ether, the ethereal solution dried and evaporated, and the residue distilled under high vacuum. There are obtained 34 g. of the title substance, which boils under 0.06 mm. Hg pressure at 196–201° C. The new phenothiazine derivative forms when raw a slightly yellow oil, readily soluble in dilute mineral acids. From the base it is possible to prepare the hydrochloride by means of ethereal hydrochloric acid. After recrystallization from anhydrous ethanol-anhydrous ether it melts at 137–140° C.

EXAMPLE 2

*10-[1'-β-methoxyethyl-pyrrolidyl-(3')-methyl]-chlorophenothiazine*

In a manner analogous to that described in Example 1 there are obtained from 40.5 g. of 3-chlorophenothiazine, 4.0 g. of lithiumamide and 28 g. of 1-β-methoxyethyl-3-chloromethyl-pyrrolidine in 270 cc. of xylene 33 g. of the title substance, which boils under 0.04 mm. Hg pressure at 205–215° C. The hydrochloride is produced by means of ethereal hydrochloric acid and recrystallized from anhydrous acetone/anhydrous ethanol. It melts at 166–168° C.

EXAMPLE 3

*10-[1'-β-methoxyethyl-pyrrolidyl-(3')-methyl]-phenothiazine*

24.2 g. of phenothiazine-10-carboxylic acid chloride in 300 cc. of anhydrous benzene are stirred for 14 hours at 120° C. oil bath temperature with 32.5 g. of 1-β-methoxyethyl-3-hydroxymethyl pyrrolidine. The reaction solution is allowed to stand for 48 hours and then shaken with water and dilute acetic acid. The aqueous solution is rendered alkaline by means of sodiumhydroxide, and the separating oil is taken up in benzene. Drying of the solvent over $K_2CO_3$ is followed by evaporation, and the residue is then triturated with little petroleum ether. There sets in immediately crystallization. After recrystallization from petroleum ether there are obtained 27 g. of phenothiazine-10-carboxylic acid-[1'-β-methoxyethyl-pyrrolidyl-(3')-methyl]-ester.

5. g. of the resulting ester are heated in a glass flask to 240–250° C. until termination of the $CO_2$-splitting (5–6 hours). After standing overnight the oily substance is transformed into the hydrochloride. There are obtained 3 g. of the hydrochloride wanted, showing a melting point of 137–140° C. This hydrochloride is in all its properties in strict conformity with the derivative obtained according to Example 1.

EXAMPLE 4

(a) 215 g. of 1-(β-benzyloxyethyl)-3-hydroxymethyl-pyrrolidine and 111 g. of triethylamine are dissolved in 230 cc. of absolute chloroform. To this solution there is dropped while stirring and cooling a solution of 192 g. of toluene sulfonyl chloride in 160 cc. of absolute chloroform. Subsequently the whole is left to stand for two hours at room temperature and then stirred for further two hours at 30° C. The reaction mixture is treated with ice water and ether and the organic layer is separated and extracted with 2 N acetic acid. The aqueous acid solution is separated and treated with concentrated $K_2CO_3$-solution. The separating oil is taken up in ether, the ethereal solution is dried over $K_2CO_3$ and evaporated. The residue represents the toluene sulfonic acid ester of the 3-hydroxymethyl-pyrrolidine. The latter is not purified further, but immediately used for the reaction.

(b) 206 g. of phenothiazine are transformed into the lithium salt with the aid of 21.2 g. of lithium amide in 220 cc. of absolute pyridine under nitrogen (1 hour's stirring at boiling temperature). After cooling to 100° C., 303 g. of the tosyl ester obtained according to (a) are added dropwise and without further heating within 20–30 minutes. Subsequently the whole is heated to boiling for one hour and then cooled down. The reaction mixture is treated with 100 cc. of water and then concentrated in vacuo for the purpose of removing the main bulk of pyridine. The residue is treated with 500 cc. of water and 1500 cc. of ether. The ethereal solution is separated and then extracted several times with 200 cc. each of 2 N acetic acid. The combined aqueous acid extracts are washed with ether and treated with concentrated sodium hydroxide. The separating oil is taken up in ether, the ethereal solution is dried and evaporated. The residue is distilled in the fine vacuum. There are thus obtained 110 g. of the 10-[1'-(β-benzyloxyethyl)-pyrrolidyl-3'-methyl]-phenothiazine boiling under 0.25 mm. Hg at 255–260° C. The oxalate of the phenothiazine obtained melts, recrystallized from dioxane, at 155–157° C.

(c) 49.8 g. of the phenothiazine obtained according to (b) in 450 cc. of absolute butanol are hydrogenated in the shaking flask under normal pressure and in the presence of 30 g. of palladium/charcoal (5%) and 65 cc. of 4 N HCl. As the absorption of hydrogen decelerates towards the end of the hydrogenation, heating is recommended. As a rule, the absorption is terminated after 2 to 3 hours. The catalyst is sucked off, the solution is filtered with celite and then concentrated in vacuo. From the residue there is prepared in absolute acetone the oxalate, this melts, recrystallized from methanol, at 155–158° C. There are obtained 29.6 g., corresponding to 59% of the theoretical value, oxalate of the 10-[1'-(β-hydroxyethyl)-pyrrolidyl-3'-methyl]-phenothiazine.

EXAMPLE 5

In analogous manner as described in Example 4 there is obtained the 10-[1' - (β-benzyloxyethyl)pyrrolidyl-3'-methyl]-3-chlorophenothiazine, boiling under 0.1 mm. Hg. at 250–255° C., from which results after reduction the 10-[1'-(β-hydroxyethyl) - pyrrolidyl-3'-methyl]-3-chlorophenothiazine.

EXAMPLE 6

11.5 g. of 10-(1'-hydroxyethyl-pyrrolidyl-3'-methyl)-phenothiazine are dissolved with 7.4 g. of triethylamine in 75 cc. of chloroform. To this solution is added under turbinating a solution of 5.5 g. of acetylchloride in 25 cc. of absolute chloroform. The temperature of the whole rises to approximately 54° C. Subsequently the batch is stirred for one hour at 56° C. and left to stand overnight. Then the whole is shaken twice with 40 cc. each of concentrated $K_2CO_3$ solution and then with 60 cc. of water and ice. The organic solution is dried over anhydrous $Na_2CO_3$ and then concentrated in the vacuum. The residue is dissolved in 80 cc. of ether, the insoluble is filtered off, the filtrate is filled up with approximately 400 cc. of ether and treated with 12.5 cc. of 2.68 N ether/HCl. After a few hours the formed crystals are filtered off by suction and recrystallized from acetone/ether. There are obtained 9 g. of the 10-(1'-acetoxyethyl-pyrrolidyl-3'-methyl) - phenothiazine, melting at 164–165° C. The new ester dissolves readily in cold water, cold ethanol and cold chloroform, dissolves little in benzene, ether and petroleum ether.

EXAMPLE 7

In analogous manner, as described in Example 6, there is obtained from 15 g. of hydroxyethyl compound and 11.1 g. of pivalic acid chloride in the presence of 10 g. of triethylamine the 10-(1'-β-pivaloyloxyethyl-pyrrolidyl-3'-methyl)-phenothiazone. From this latter can be prepared in acetone the oxalate, which melts at 145–148° C. The oxalate can be recrystallized from a mixture of acetone/dioxane/ether. The new salt dissolves well in water, ethanol and dioxane in the heat, little in benzene, ether and petroleum ether.

EXAMPLE 8

In analogous manner, as described in Example 6, there are obtained from 15 g. of hydroxyethyl compound and 8.5 g. of propionic acid chloride in the presence of 10 g. of triethylamine the 10-(1'-β-propionyloxyethyl-pyrrolidyl-3'-methyl)-phenothiazine. From this is prepared in acetonic solution the oxalate by means of oxalic acid. This melts, recrystallized from acetone/ether/ethanol, at 139–141° C. The new salt is well soluble in water and ethanol in warm condition, little soluble in acetone in cold condition and well soluble in hot condition, and moderately soluble in benzene, ether and petroleum ether.

EXAMPLE 9

15 g. of 10-(1'-β-hydroxyethyl-pyrrolidyl-3'-methyl)-phenothiazine are dissolved with 10 g. of triethylamine in 90 cc. of absolute chloroform. To this solution is added dropwise under strong turbinating a solution of 9.9 g. of dimethylcarbamic acid chloride in 25 cc. of absolute chloroform. The whole is stirred for 1¼ hours at 55–60° C. internal temperature and left to stand overnight. Then the whole is treated with 40 cc. of concentrated $K_2CO_3$ solution and ice and shaken well. The layers are separated, the organic layer is dried over silica gel and concentrated. The residue is dissolved in acetone and to this solution is added a solution of 3.05 g. of anhydrous oxalic acid in 15 cc. of acetone. The separating crystals are recrystallized from absolute dioxane. There are obtained 12 g. of the oxalate of the 10-(1'-β-N,N-dimethyl-carbamyloxyethyl-pyrrolidyl-3'-methyl) - phenothiazine, melting at 155–157° C. The salt of the new ester dissolves moderately in water and ethanol in cold condition, well in the heat. It dissolves little in cold dioxane, well in hot dioxane; the salt is practically insoluble in ether and petroleum ether.

In analogous manner there is obtained the N-methyl-carbamate, the N-ethyl-carbamate, the N-propyl- and N-butyl-carbamate by reacting the 1-β-hydroxyethyl compound with methylisocyanate, ethylisocyanate, propylisocyanate, butylisocyanate. Corresponding N,N-disubstituted carbamic acid esters are obtained by reacting with N,N-diethylcarbamic acid chloride, N,N-dipropylcarbamic acid chloride, piperidino- or morpholino-N-carbonic acid chloride, 1-methylpiperazino-4-carbonic acid chloride, etc. Instead of acetic acid, propionic acid, pivalic acid there can also be acylated with: methoxyacetic acid, β-methoxypropionic acid, butyric acid, valerianic acid, isobutyric acid, isovalerianic acid or their halogenides and anhydrides respectively.

EXAMPLE 10

(a) 66.1 g. of 2-benzyloxypropylamine, 52 g. of itaconic acid and 5 cc. of water are heated in a metal bath while stirring in an open flask. The temperature is increased to 180° C. within one hour and then the whole is allowed to cool down. In order to remove any moisture, the whole is dried in the vacuum for one hour, resulting then an orange colored resin which represents 1-(2'-benzyloxypropyl)-pyrrolidone-5-carboxylic acid (3).

(b) A solution of 109 g. of the pyrrolidone obtained as described under par. (a) in 130 cc. of absolute dioxane is added to a suspension of 32 g. of $LiAlH_4$ in a mixture of 200 cc. of absolute dioxane and 120 cc. of absolute tetrahydrofuran. This is to be added dropwise within about 40 minutes. The temperature is kept at 70° C. by means of ice water cooling. The whole is now stirred for 8 hours at a temperature of 75–80° C., it is left to stand over night, disintegrated with 65 cc. of water and then 35 cc. of concentrated NaOH and 125 g. of $Na_2CO_3$ are added. The solution is stirred thoroughly, the insoluble parts are filtered off with suction, washed with dioxane and the filtrate is concentrated in vacuo. The residue is fractionated in the high vacuum. There are obtained 83.7 g. of the 1-(2'-benzyloxypropyl)-3-hydroxymethyl-pyrrolidine, boiling under 0.05 mm. Hg at 124–126° C. The new hydroxymethyl-pyrrolidine represents a colorless oil, soluble in acids.

(c) To a solution of 83.5 g. of the 3-hydroxymethyl-pyrrolidine obtained as described under par. (b) in 125 cc. of absolute chloroform is added dropwise a solution of 52.5 g. of thionylchloride in 80 cc. of chloroform under stirring and cooling with ice water. Subsequently the whole is heated to boiling for two hours under stirring in the water bath. After concentrating in the vacuum the residue is mixed with ice water and a solution of 170 cc. of concentrated $K_2CO_3$ and shaken repeatedly with ether. The combined ether extracts are dried over $Na_2CO_3$ and the solvent is distilled off. The residue is fractionated in the high vacuum and results in 80 g. of the 1-(2'-benzyloxypropyl)-3-chloromethyl-pyrrolidine boiling under 0.09 mm. Hg at 119–123° C. The new chloromethyl-pyrrolidine represents a clear yellowish liquid.

(d) 87 g. of pure phenothiazine are dissolved in 80 cc. of absolute tetrahydrofuran. This solution is then mixed with 9.3 g. of lithium amide and the whole is heated under nitrogen while stirring up to 70° C. One hour later the lithium salt results and precipitates partly. 80 g. of the chloromethyl compound obtained according to par. (c) are added dropwise and the whole is heated to boiling while stirring for 24 hours. After cooling, 150 cc. of tetrahydrofuran and 250 cc. of 2 N sodium hydroxide are added, this is stirred thoroughly and the layers are separated in the separating funnel. The aqueous solution is then extracted once more with tetrahydrofuran. The combined organic layers are dried over sodium and concentrated in the vacuum. After purification (in a manner as described in Example 2), 50 g. of an oil boiling under 0.08 mm. Hg at 234–238° C. are obtained, representing the 10-[1'-(2''-benzyloxypropyl)-pyrrolidyl-3'-methyl]-phenothiazine. The oxalate can be prepared in acetone as solvent from the base and can be recrystallized from ethanol and melts thus purified at 144–146° C.

(e) 8 g. of the phenothiazine obtained as described under par. (d) are hydrogenated in 80 cc. of absolute ethanol in the presence of 6 g. of Pd/C-catalyst (5%) and 6.3 g. of HBr (48%) in the shaking flask at a slightly increased temperature (60–65° C.). The absorption of nitrogen is terminated after about 3 hours. The catalyst is sucked off and washed in hot ethanol. The filtrate is concentrated in vacuo nearly to dryness and the residue is mixed with absolute ether. The so formed crystals are recrystallized from absolute ethanol resulting in 4 g. of the hydrobromide of the 10-[1'-(2''-hydroxypropyl)-pyrrolidyl-3'-methyl]-phenothiazine, melting at 203–204° C. The hydrobromide of the new phenothiazine is hardly soluble in cold water and moderately soluble in hot water.

As substances with strong central analgetic effect we prefer to use compounds of the formula

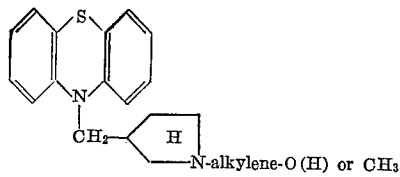

wherein alkylene contains from 2 to 3 carbon atoms, and the pharmaceutically acceptable acid addition salts, and especially the compounds of the formula

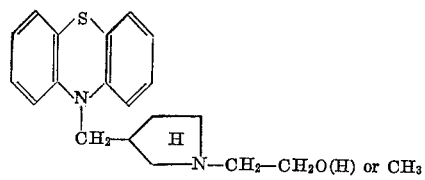

As compounds with strong analgetic and psychosedative effect we prefer to use those of the formula

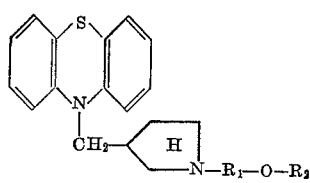

wherein $R_1$ represents an alkylene radical having 2 to 3 carbon atoms, and $R_2$ is a lower carboxylic acyl radical, a lower N-alkyl carbamic acid radical or a di-N,N-lower alkyl carbamic acid radical and especially the compound of the formula

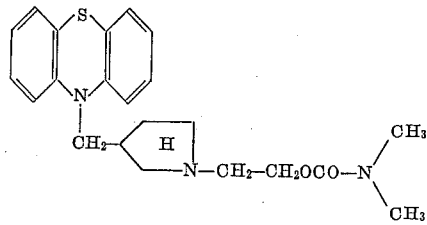

What we claim is:
1. A member selected from the group consisting of a phenothiazine derivative of the formula

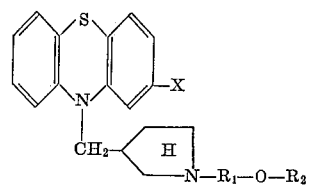

wherein X represents a substituent selected from the class consisting of hydrogen and chlorine, $R_1$ represents an alkylene radical having 2 to 3 carbon atoms, and $R_2$ is a group selected from the class consisting of hydrogen, methyl and lower carboxylic acyl, and the pharmaceutically acceptable acid addition salt of the said phenothiazine derivative.

2. A member selected from the group consisting of a phenothiazine derivative of the formula

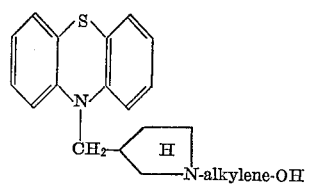

wherein alkylene contains from 2 to 3 carbon atoms, and the pharmaceutically acceptable acid addition salt.

3. A member selected from the group consisting of a phenothiazine derivative of the formula

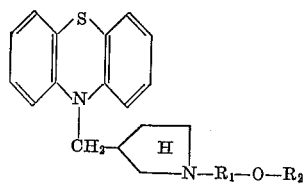

wherein $R_1$ represents an alkylene radical having 2 to 3 carbon atoms, and $R_2$ is selected from the lower carboxylic acyl radical, the lower N-alkyl carbamic acid radical and the di-N,N-lower alkyl carbamic acid radical.

4. The compound of the formula

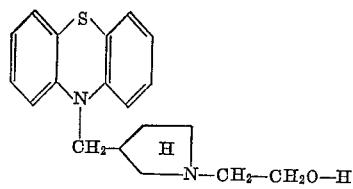

5. The compound of the formula
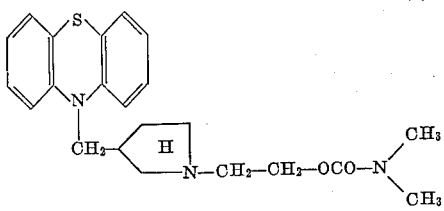
6. The compound of the formula
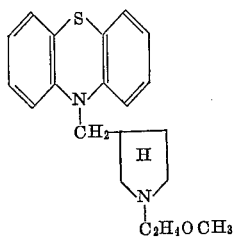
7. The compound of the formula
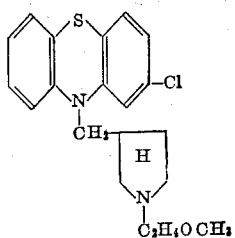
No references cited.
JOHN D. RANDOLPH, *Primary Examiner.*
WALTER A. MODANCE, *Examiner.*
HARRY I. MOATZ, *Assistant Examiner.*